United States Patent
Sousa et al.

(10) Patent No.: US 9,380,436 B2
(45) Date of Patent: *Jun. 28, 2016

(54) CONTACT ENTRY POPULATION FROM CALL ENTITY INFORMATION

(71) Applicant: MICROSOFT TECHNOLOGY LICENSING, LLC, Redmond, WA (US)

(72) Inventors: Audrey Yung-Ch'In Sousa, Seattle, WA (US); Arturo Ortiz Asbun, Seattle, WA (US); Robert Paul St. Pierre, Redmond, WA (US); Charles B. Schweizer, Redmond, WA (US); Kevin A. Chin, Bellevue, WA (US); Shawn Michael Brown, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/198,349

(22) Filed: Mar. 5, 2014

(65) Prior Publication Data

US 2014/0187217 A1 Jul. 3, 2014

Related U.S. Application Data

(63) Continuation of application No. 12/335,552, filed on Dec. 16, 2008, now Pat. No. 8,676,755.

(51) Int. Cl.
| | |
|---|---|
| *G06F 7/00* | (2006.01) |
| *G06F 17/30* | (2006.01) |
| *H04W 4/16* | (2009.01) |
| *G06Q 10/10* | (2012.01) |
| *G06Q 30/02* | (2012.01) |

(Continued)

(52) U.S. Cl.
CPC ............. *H04W 4/16* (2013.01); *G06F 17/3089* (2013.01); *G06Q 10/10* (2013.01); *G06Q 30/02* (2013.01); *H04L 67/18* (2013.01); *H04L 67/20* (2013.01); *H04L 67/306* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 6,052,735 | A | 4/2000 | Ulrich et al. |
| 6,397,059 | B1 | 5/2002 | Vance et al. |

(Continued)

OTHER PUBLICATIONS

"Search Now by Cell Number!", Retrieved at <<http://reversecellphonedirectory.net/>>, Aug. 10, 2008, 5 Pages.

(Continued)

*Primary Examiner* — Uyen Le
(74) *Attorney, Agent, or Firm* — Jim Banowski; Judy Yee; Micky Minhas

(57) ABSTRACT

Populating a contact entry with selected entity information based on an identifier associated with a call (e.g., a telephone call, VoIP call, text message, electronic mail message, or any other communication). As the call is detected, entity information for the identifier (e.g., a telephone number, VoIP address, MAC address, etc.) is generated. The entity information is filtered based on a category of the entity information, user preferences, location of a computing device (e.g., mobile telephone) of the user, or other filtering criteria. The filtered entity information is associated with the contact entry for the identifier, thereby enhancing the contact entry while reducing typing on the computing device. In some embodiments, additional information such as advertisements for a competitor of the entity are provided to the user.

20 Claims, 10 Drawing Sheets

(51) Int. Cl.
*H04W 4/02* (2009.01)
*H04L 29/08* (2006.01)

(56) References Cited

U.S. PATENT DOCUMENTS

| | | | |
|---|---|---|---|
| 6,782,086 B2 | 8/2004 | Clapper | |
| 6,909,910 B2 | 6/2005 | Pappalardo et al. | |
| 7,187,932 B1 | 3/2007 | Barchi | |
| 7,231,229 B1 | 6/2007 | Hawkins et al. | |
| 7,280,647 B2 | 10/2007 | Henderson | |
| 8,566,029 B1 * | 10/2013 | Lopatenko et al. | 701/426 |
| 2003/0216860 A1 * | 11/2003 | Shitamatsu et al. | 701/211 |
| 2004/0066920 A1 | 4/2004 | Vandermeijden | |
| 2004/0119760 A1 | 6/2004 | Grossman et al. | |
| 2005/0053220 A1 | 3/2005 | Helbling et al. | |
| 2006/0195472 A1 | 8/2006 | Cadiz et al. | |
| 2006/0282450 A1 | 12/2006 | Barnes | |
| 2007/0041527 A1 | 2/2007 | Tuchman et al. | |
| 2007/0064920 A1 | 3/2007 | Ruckart | |
| 2007/0191034 A1 | 8/2007 | Lee et al. | |
| 2007/0208564 A1 | 9/2007 | Tran | |
| 2007/0250645 A1 | 10/2007 | Meadows et al. | |
| 2007/0280445 A1 | 12/2007 | Shkedi | |
| 2008/0010297 A1 | 1/2008 | Goldfarb et al. | |
| 2008/0114862 A1 | 5/2008 | Moghaddam et al. | |
| 2008/0147771 A1 | 6/2008 | Bertolino | |
| 2008/0167796 A1 | 7/2008 | Narayanaswami | |
| 2008/0222127 A1 | 9/2008 | Bergin | |
| 2008/0281507 A1 * | 11/2008 | Bergman | 701/201 |
| 2009/0089308 A1 | 4/2009 | Beadle et al. | |
| 2009/0104920 A1 | 4/2009 | Moon et al. | |
| 2009/0149200 A1 | 6/2009 | Jayasinghe et al. | |
| 2009/0157717 A1 | 6/2009 | Palahnuk et al. | |
| 2010/0153459 A1 | 6/2010 | Sousa et al. | |
| 2012/0010998 A1 | 1/2012 | Spreen et al. | |

OTHER PUBLICATIONS

Chartier, Arthur, "Reverse Phone Call Lookup-Get the Name, Address of Any Phone Number!", Retrieved at <<http://www.goarticles.com/cgi-bin/showa.cgi?C=953771>>, Aug. 10, 2008, 2 Pages.

"And Phone DECT", Retrieved at <<http://www.andtek.com/communications-products-dect.html>>, Aug. 10, 2008, 1 Page.

"Non-final Office Action in U.S. Appl. No. 12/335,552", Mailed Date: Jun. 29, 2011, Filed Date: Dec. 16, 2008, 17 Pages.

"Final Office Action in U.S. Appl. No. 12/335,552", Mailed Date: Oct. 19, 2011, Filed Date: Dec. 16, 2008, 23 Pages.

"Advisory Action for U.S. Appl. No. 12/335,552", Mailed Date: Jan. 20, 2012, Filed Date: Dec. 16, 2008, 3 pages.

"Non-final Office Action in U.S. Appl. No. 12/335,552", Mailed Date: Jul. 9, 2013, Filed Date: Dec. 16, 2008, 10 Pages.

"Notice of Allowance in U.S. Appl. No. 12/335,552", Mailed Date: Oct. 29, 2013, Filed Date: Dec. 16, 2008, 10 Pages.

* cited by examiner

US 9,380,436 B2

CONTACT ENTRY POPULATION FROM CALL ENTITY INFORMATION

CROSS-REFERENCE TO RELATED APPLICATION

This application is a continuation of U.S. Pat. No. 8,676,755, filed Dec. 16, 2008, "Contact Population from Call Entity Information," the entirety of which is hereby incorporated by reference herein.

BACKGROUND

Creating contact entries on a computing device such as a mobile telephone is often time consuming. The small form factor of some of these devices, including the reduced keyboard size, makes it difficult to rapidly enter information such as the proper entity name, address, and complete telephone numbers. Some users occasionally cradle or otherwise connect their mobile telephones to a desktop or laptop computer to synchronize the contact information stored on the computer. However, many users fail to regularly synchronize their contacts, leaving the users with incomplete contact entries. Additionally, the information input by the user into the mobile computing device is basic.

SUMMARY

Embodiments of the invention enable the creation or update of contact entries on a computing device based on call information. As a call on the computing device is detected, an identifier (e.g., telephone number) associated with the call is determined. Entity information for the identifier is generated. A subset of the entity information is selected based on filtering criteria. The selected subset of the entity information is associated with a contact entry for the identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure create or update contact information based on calls between computing devices. The contents of the contact information varies and includes items or fields such as a name, work telephone number, home telephone number, street address, Internet protocol (IP) address for a voice-over-IP device, and any other information that can be linked with the person or organization. In some embodiments of the invention, the contact information is obtained based on one of the telephone numbers involved in the call. The contact information or other supplemental information may be obtained during the call or after the call has terminated, depending on the configuration and capabilities of the computing devices and network involved. Additionally, attempts to obtain the contact information may be triggered by outbound calls and/or inbound calls (e.g., including ignored or missed calls).

In some embodiments, the call represents a telephone call, VoIP call, text message, electronic mail message, or any other communication. In such embodiments, the detection of the communication triggers performance of the functionality described and illustrated herein. That is, aspects of the disclosure are not limited to telephone calls.

Figure 1:
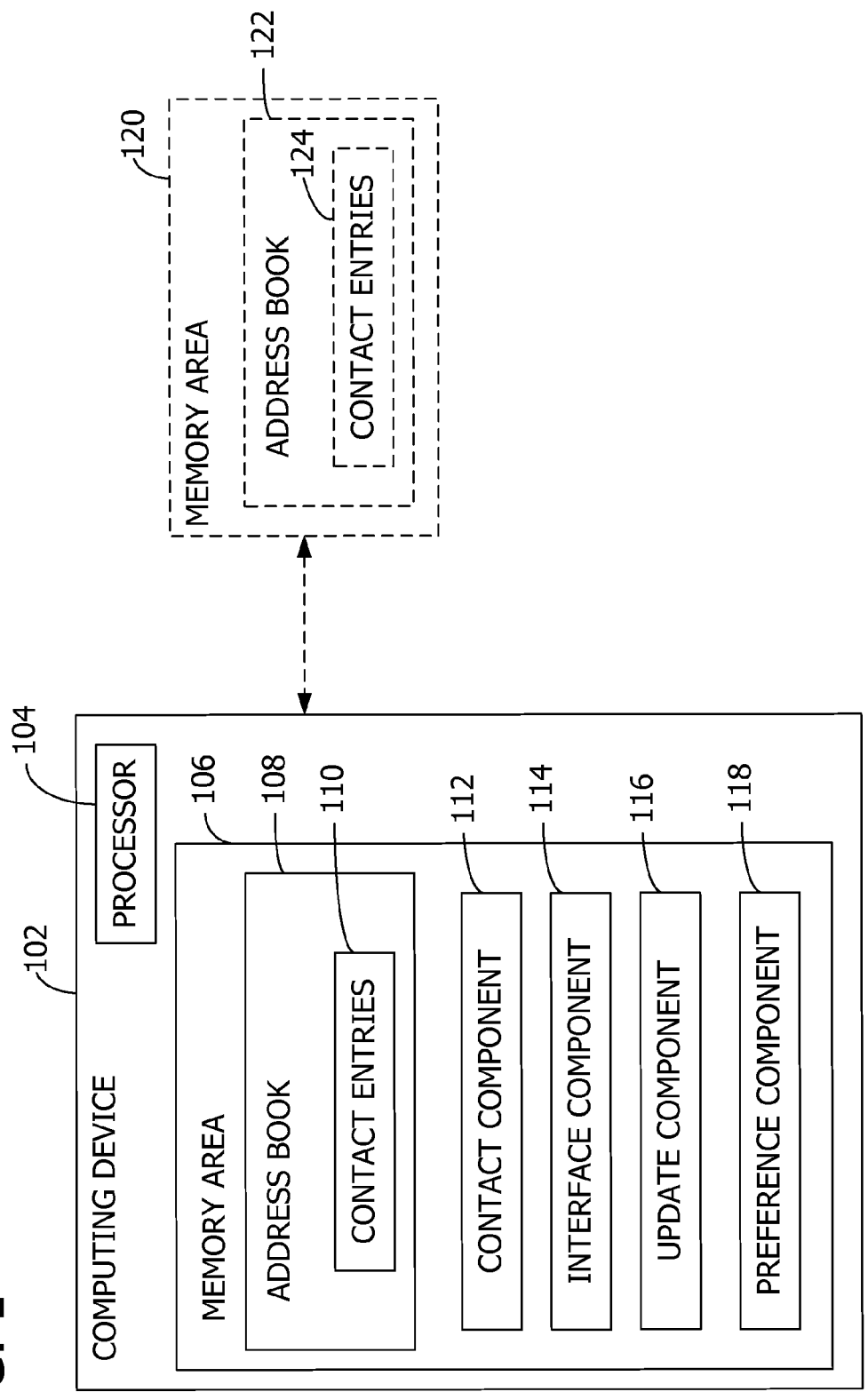
FIG. 1 is an exemplary block diagram illustrating a computing device storing contact entries in an address book.

As shown in FIG. 1, a computing device 102 such as a mobile computing device 204 stores one or more contact entries 110, for example, in an address book 108. While aspects of the invention are described with reference to the computing device 102 being the mobile computing device 204 such as a mobile telephone, embodiments of the invention are operable with any computing device. For example, aspects of the invention are operable with devices such as laptop computers, gaming consoles (including handheld gaming consoles), hand-held or vehicle-mounted navigation devices, portable music players, a personal digital assistant, an information appliance, a personal communicator, a hand-held television, or any other type of electronic device. Further, aspects of the invention are operable with any form of communication between devices including, for example, a mobile telephone call and a VOIP call.

A memory area 106 associated with the computing device 102 stores the address book 108. In the example of FIG. 1, the memory area 106 is within or otherwise accessible to the computing device 102. In other embodiments, a memory area 120 storing an address book 122 and one or more contact entries 124 is remote from the computing device 102. For example, the memory area 120 may be accessible to a server or other computer such that the address book 122 is available on any device (e.g., laptop, desktop, telephone, etc.).

The computing device 102 has a processor 104 associated therewith. The processor 104 is programmed to execute computer-executable instructions for implementing aspects of the disclosure. In an example in which the computing device 102 is the mobile computing device 204, the processor 104 is programmed to execute instructions such as those described in FIG. 5.

The memory area 106 or other computer-readable media further stores computer-executable components including a contact component 112, an interface component 114, an update component 116, and a preference component 118, described next with reference to FIG. 2.

Figure 2:
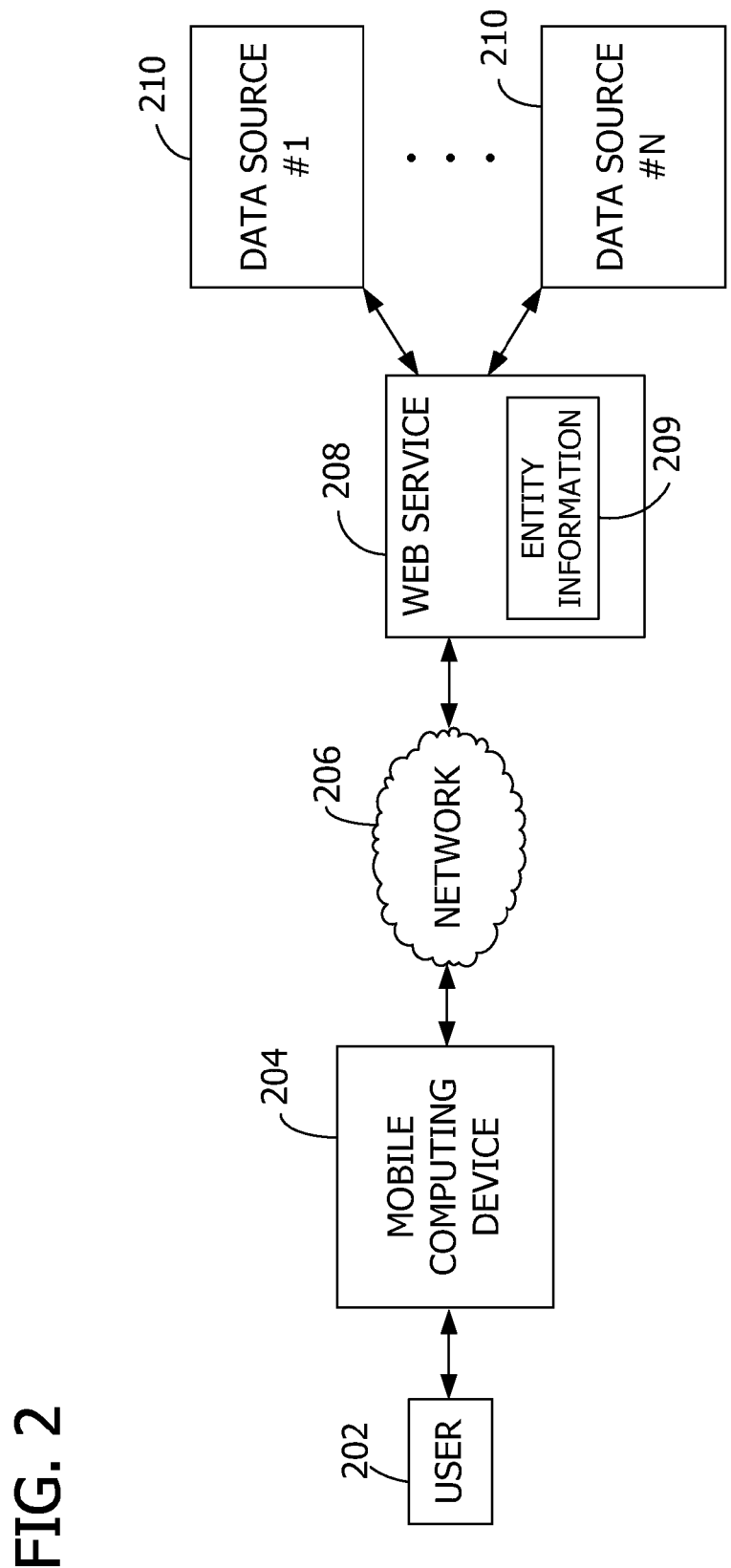
FIG. 2 is an exemplary block diagram illustrating a computing device receiving entity information from a web service.

Referring next to FIG. 2, an exemplary block diagram illustrates the mobile computing device 204 receiving entity information 209 from a web service 208. In the example of FIG. 2, the computing device 102 is the mobile computing device 204 such as a mobile telephone or personal digital assistant (PDA). The contact component 112 maintains the address book 108 for a user 202. Each user 202 has an address book 108. The interface component 114 detects a call inbound to or outbound from the mobile computing device 204. The call has a telephone number associated therewith. The update component 116 receives the entity information 209 from one or more data sources 210 such as data source #1 through data source #N, where N is a positive integer. The entity information 209 is retrieved from the data sources 210 responsive to detection of the telephone number associated with the call, and stored at least temporarily by the web service 208. The entity information 209 relates to the telephone number detected by the contact component 112. The mobile computing device 204 receives, via the network 206, the entity information 209 from the web service 208.

The preference component 118 filters or supplements the entity information 209 received by the update component 116 based on a location of the mobile computing device 204 and/or a category associated with the entity information 209. The contact component 112 edits the contact entry 110 for the telephone number with the filtered entity information 209. For example, the entity information 209 is filtered, supplemented, or otherwise modified based on the location of the mobile computing device 204 such that a map, store hours, coupons, or advertisements relevant to that location are stored in the address book 108 or provided for display to the user 202. The location of the mobile computing device 204 may be determined, for example, by a global positioning system (GPS), by the area code of the telephone number of the mobile computing device 204, or by a zip code. In some embodiments, the entity is filtered based on a history of location data provided by the mobile computing device 204. For example, supplemental information may be obtained based on frequently visited locations.

Figure 3:
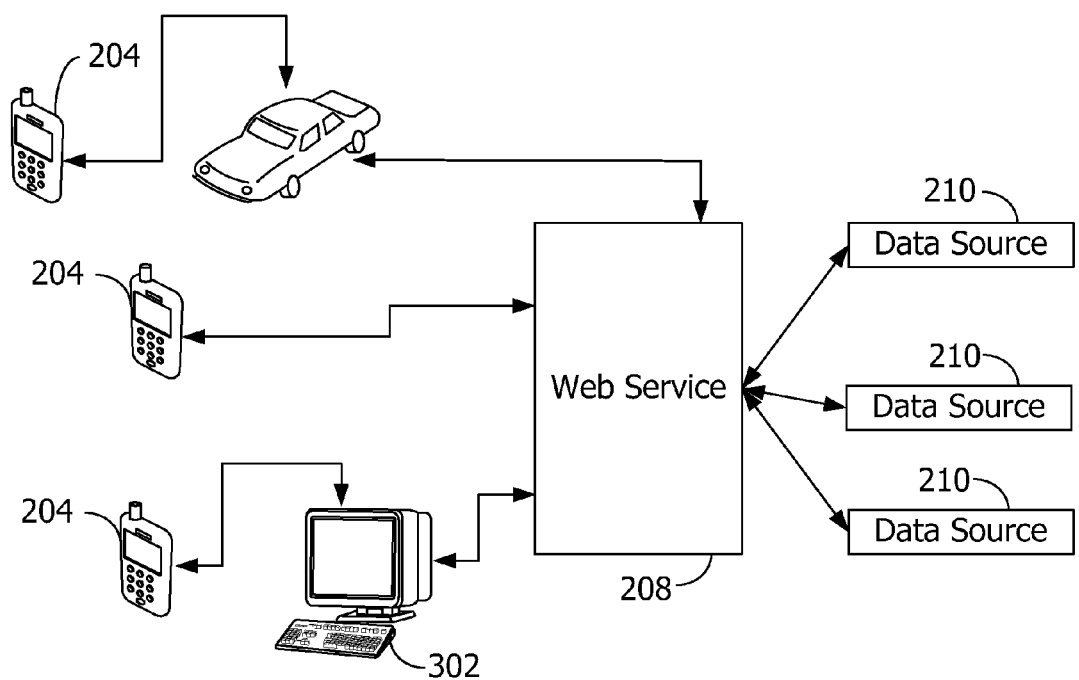
FIG. 3 is an exemplary block diagram illustrating various connections between a mobile computing device and a web service.

Referring next to FIG. 3, an exemplary block diagram illustrates various connections between the mobile computing device 204 and the web service 208. The mobile computing device 204 may receive the entity information 209 from the web service 208 while the mobile computing device 204 is located in a moving vehicle, while the mobile computing device 204 is stationary (e.g., located in a home or office) and not connected to another device, or while the mobile computing device 204 is cradled or connected to a laptop or desktop computer 302. In the different embodiments illustrated in FIG. 3, the entity information 209 is provided to the mobile computing device 204 at various times: during the call, immediately after the call, or upon the next cradling or synchronization of the mobile computing device 204 with the desktop computer 302. The timing of the delivery of the entity information 209 may be optimized based on data charges, bandwidth, and other factors. In some embodiments, the desktop computer 302 trawls the called list of the mobile computing device 204 when docked and obtains the entity information 209 for each of the called telephone numbers.

The separate data sources 210 correspond to one or more information references including databases of publicly available information as well as proprietary or private databases.

Figure 4:
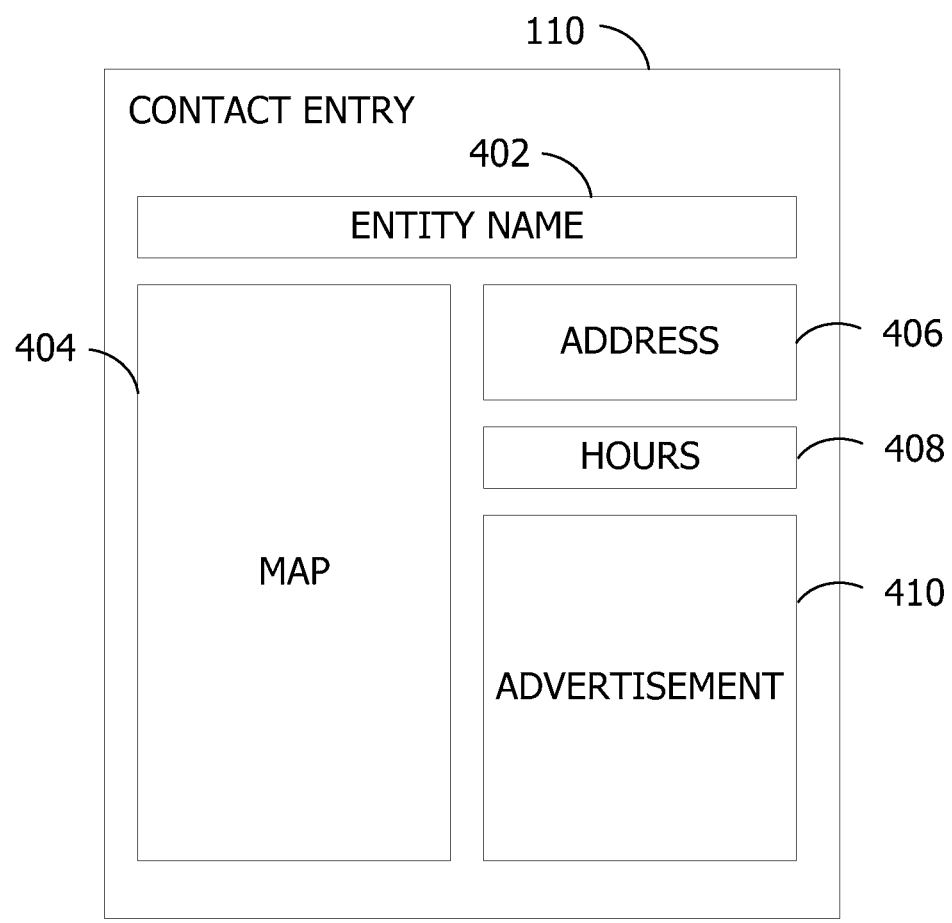
FIG. 4 is an exemplary block diagram illustrating entity information stored in a contact entry.

Referring next to FIG. 4, an exemplary block diagram illustrates entity information 209 stored in the contact entry 110. Each contact entry 110 has any quantity and type of fields for storing data, and the configuration of contact entries 110 may differ from each other within the same address book 108. In the example of FIG. 4, the contact entry 110 relates to a commercial entity and includes one or more of the following: an entity name 402, a map 404, an address 406, hours of operation 408, facsimile number, and one or more advertisements 410. The map 404 may be relative to a current location of the mobile computing device 204 (e.g., and include turn-by-turn directions). In an example in which the contact entry 110 relates to a person (not shown), the fields include one or more of the following: a name, residential address, telephone number, mobile telephone number, email address, picture, a map to the residential address, a time zone of the residential address, and hobbies or interests of the person. Various other fields, types, and categories of data are contemplated. For example, one field may be configured to receive Really Simple Syndication (RSS) feeds relating to the contact. The RSS field in the contact entry 110 may be updated regularly (e.g., daily, weekly, etc.).

Figure 5:
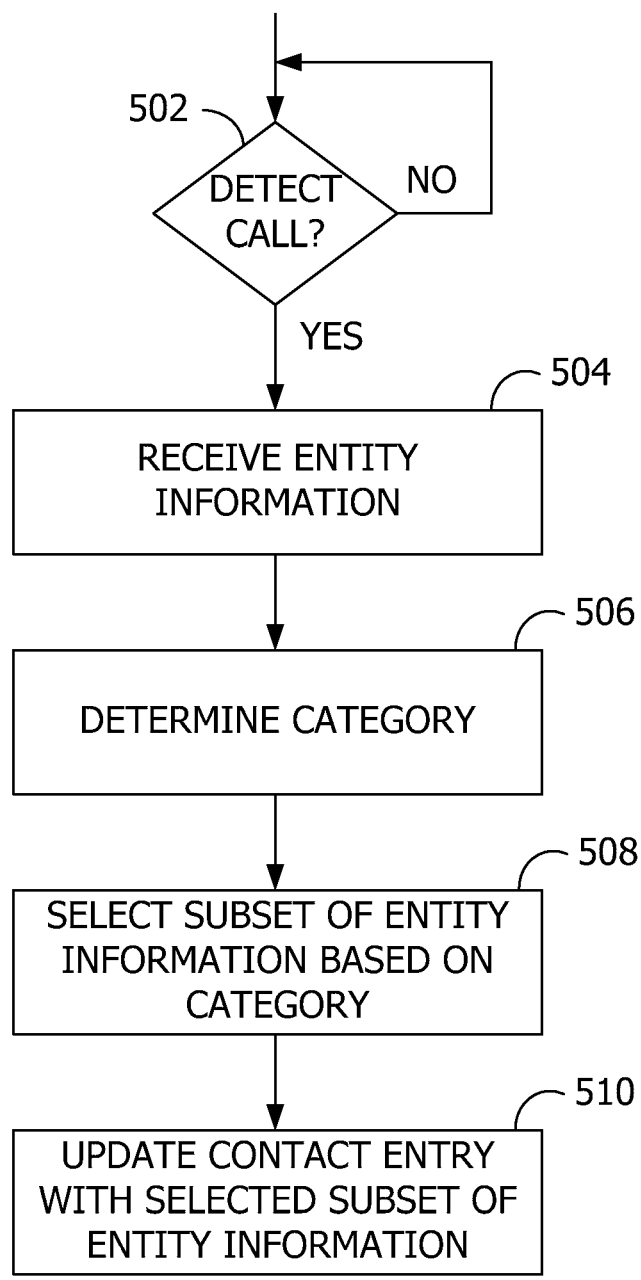
FIG. 5 is an exemplary flow chart illustrating operation of a computing device to filter and store entity information based on a category.

Referring next to FIG. 5, an exemplary flow chart illustrates operation of the computing device 102 to filter and store entity information 209 based on a category. The entity information 209 may be filtered or supplemented by the computing device 102 (as in FIG. 5), by the web service 208 (as in FIG. 6), or a combination of both. If a call is detected at 502 (e.g., by the computing device 102), the entity information 209 is retrieved. For example, an identifier such as a telephone number, IP address, or media access control (MAC) address associated with the detected call is provided to the web service 208. The entity information 209 is received by the computing device 102 at 504. The entity information 209 may be received as hypertext markup language (HTML) or extensible markup language (XML) in some embodiments.

In some embodiments, the entity information 209 includes an entity name. A category describing the entity information 209 is determined at 506. Example categories include a person, commercial entity, restaurant, home improvement, hotel/motel, bank, and church. Some embodiments contemplate sub-categories and other refined categories. In the restaurant category, for example, sub-categories describe the type of cuisine, environment (e.g., casual or dressy), average meal price at the restaurant, and more.

At 508, a subset of the entity information 209 is selected based on the category determined at 506. The contact entry 110 for the identifier is updated, populated, or created at 510 with the selected subset of the entity information 209.

Figure 6:
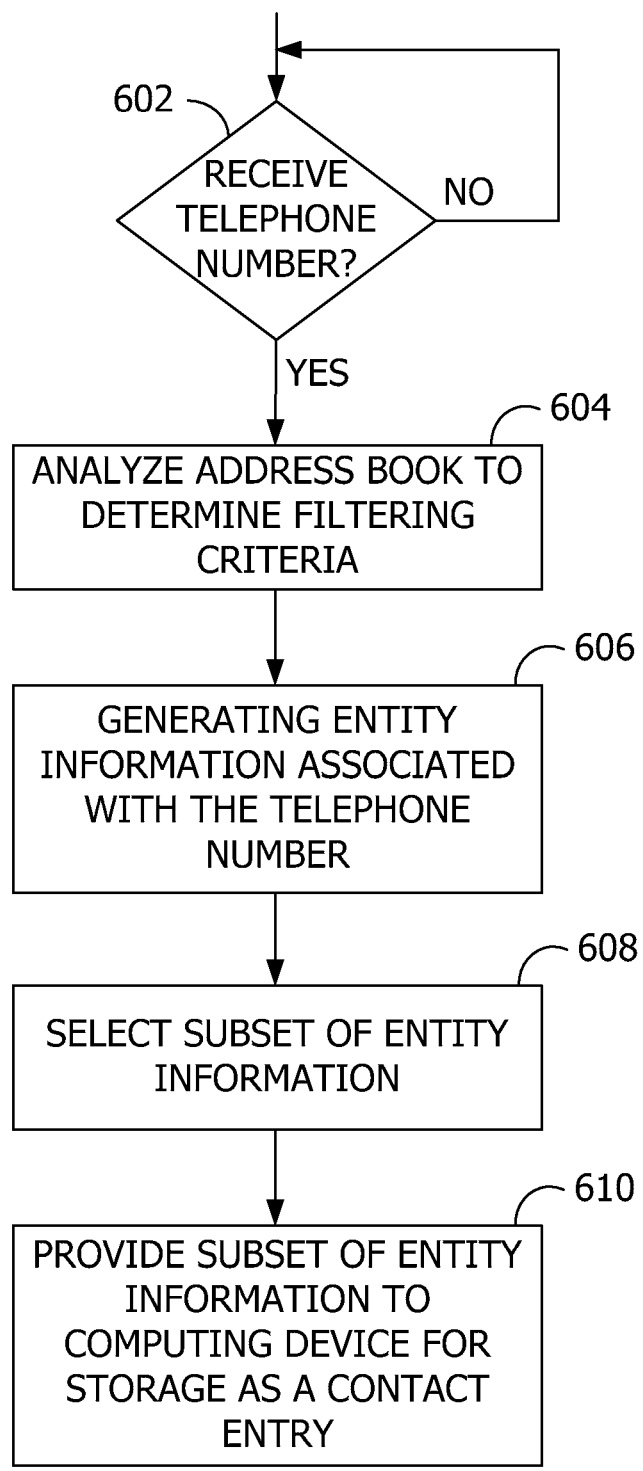
FIG. 6 is an exemplary flow chart illustrating operation of a web service to profile an address book to filter entity information for delivery to a computing device.

Referring next to FIG. 6, an exemplary flow chart illustrates operation of the web service 208 to profile the address book 108 to filter entity information 209 for delivery to the computing device 102. In the example of FIG. 6, the address book 108 for the user 202 is accessible to the web service 208. Additionally, the web service 208 may be a gateway or notification platform. If the web service 208 receives an identifier associated with the call at 602 (e.g., a telephone number, IP address, MAC address, etc.), the web service 208 analyzes the address book 108 at 604 to determine one or more filtering criteria, or otherwise profile the user 202 or the computing device 102. For example, the web service 208 attempts to identify whether the other contact entries 110 include graphics or text, maps, directions, coupons, computing device type or model or brand, etc. In this embodiment, the web service 208 attempts to empirically discern the preferences of the user 202. In other embodiments, the preferences may be explicitly defined or identified by the user 202. The computing device type may be used to identify the format in which to provide the entity information 209.

At 606, entity information 209 for the received or determined identifier is generated and selected at 608 based on the determined filtering criteria. The selected entity information 209 is in conformance with the type and style of address book 108 data analyzed by the web service 208. The selected entity information 209 is provided to the computing device 102 at 610 for storage in the address book 108. For example, the user 202 may be prompted to accept the generated entity information 209. In other embodiments, the computing device 102 stores the generated entity information 209 without input from the user 202.

In embodiments in which the web service 208 defines a category for the selected entity information 209, the web service 208 may generate additional content for delivery to the computing device 102. For example, one or more competing retailers may be identified to the user 202, along with any current promotions of the retailers.

Figure 7:
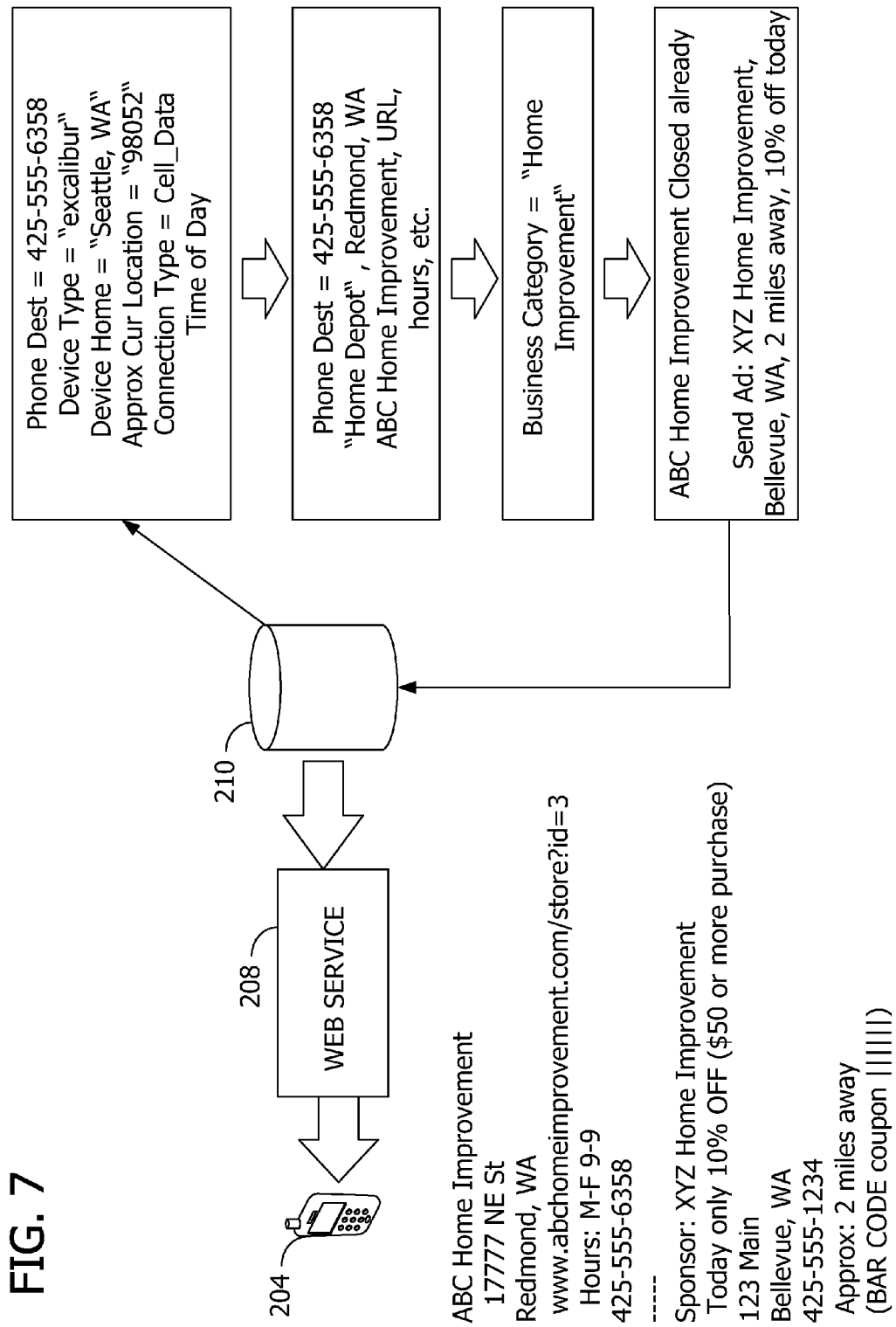
FIG. 7 is an exemplary block diagram illustrating a web service generating entity information based on an example "home improvement" category.

Referring next to FIG. 7, an exemplary block diagram illustrates the web service 208 generating entity information 209 based on an example "home improvement" category. In the example of FIG. 7, the mobile computing device 204 calls a home improvement warehouse. The destination telephone number is provided from the mobile computing device 204 to the web service 208, along with the device type, device home city, approximate current location of the mobile computing device 204, a connection type, and a time of day. Based on this information, the web service 208 identifies a retailer, location, web site address, and hours of operation. Noting that the retailer is currently closed, the web service 208 identifies the category for the retailer as home improvement. Based on the category, the web service 208 identifies a competitor to the retailer and obtains an advertisement and directions to the competitor. This information is provided to the mobile computing device 204, which displays the information and/or updates contact entry 110 on the mobile computing device 204.

In other embodiments, the web service 208 identifies the competitor based on, for example, a sponsor payment by the competitor and a location of the mobile computing device 204. For example, the competitor is selected based on a current location or route of the mobile computing device 204. Such embodiments are referred to as "categorization mapping" from the identifier of the call to a commercial entity.

Figure 8:
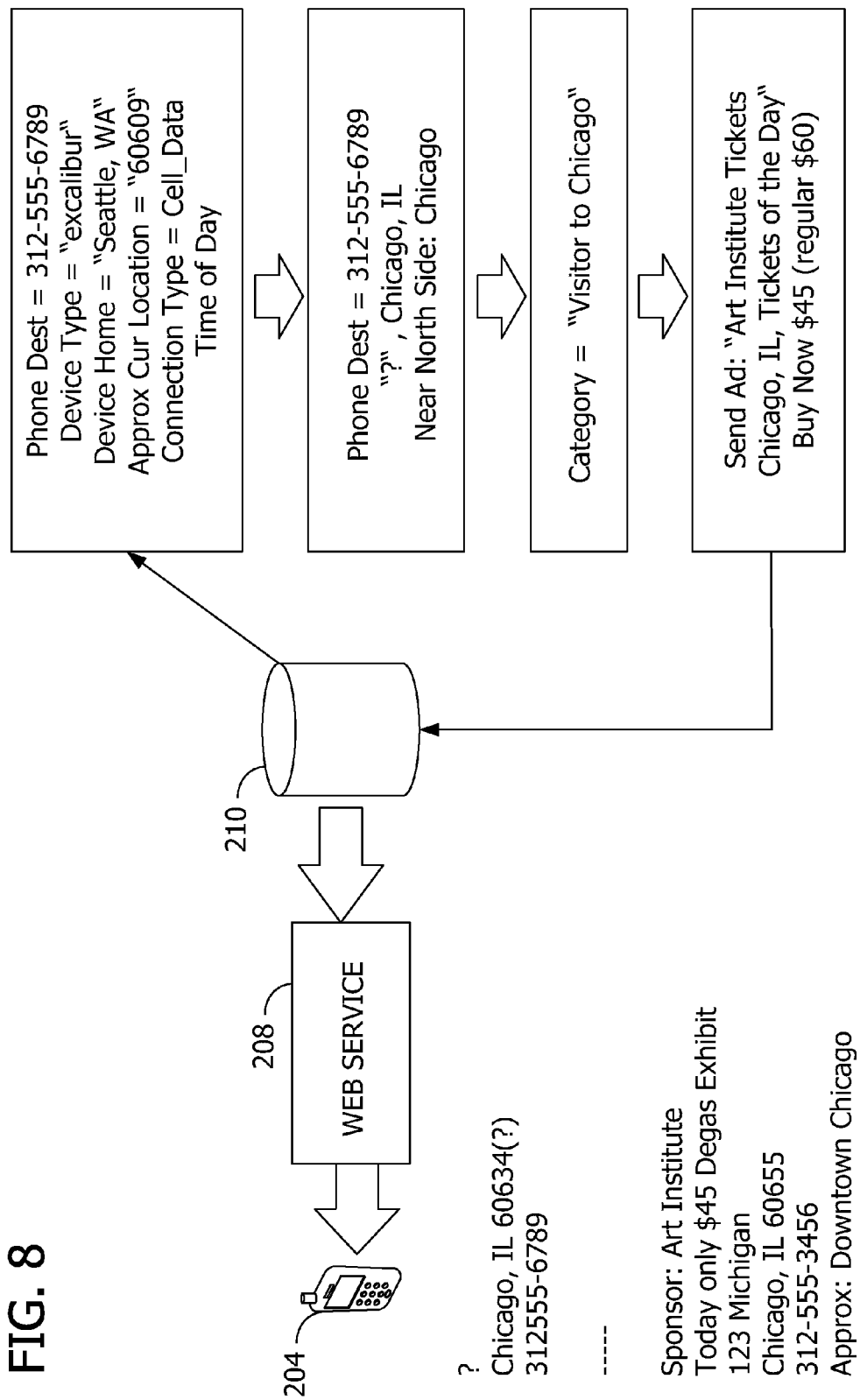
FIG. 8 is an exemplary block diagram illustrating a web service generating entity information based on an example "visitor" category.

Referring next to FIG. 8, an exemplary block diagram illustrates the web service 208 generating entity information 209 based on an example "visitor" category. In the example of FIG. 8, the mobile computing device 204 calls an entity in Chicago. The destination telephone number is provided from the mobile computing device 204 to the web service 208, along with the device type, device home city, approximate current location of the mobile computing device 204, a connection type, and a time of day. Based on this information, the web service 208 attempts to identify the callee, but is unsuccessful. The web service 208 identifies the location of the callee as the near north side in Chicago. The web service 208 identifies a category for the callee as a visitor to Chicago. Based on the category, the web service 208 identifies a tourist attraction in the identified area of the callee. The web service 208 identifies the tourist attraction to the mobile computing device 204, along with an advertisement and address of the tourist attraction. This information is provided to the mobile computing device 204, which displays the information and/or updates contact entry 110 on the mobile computing device 204.

Figure 9:
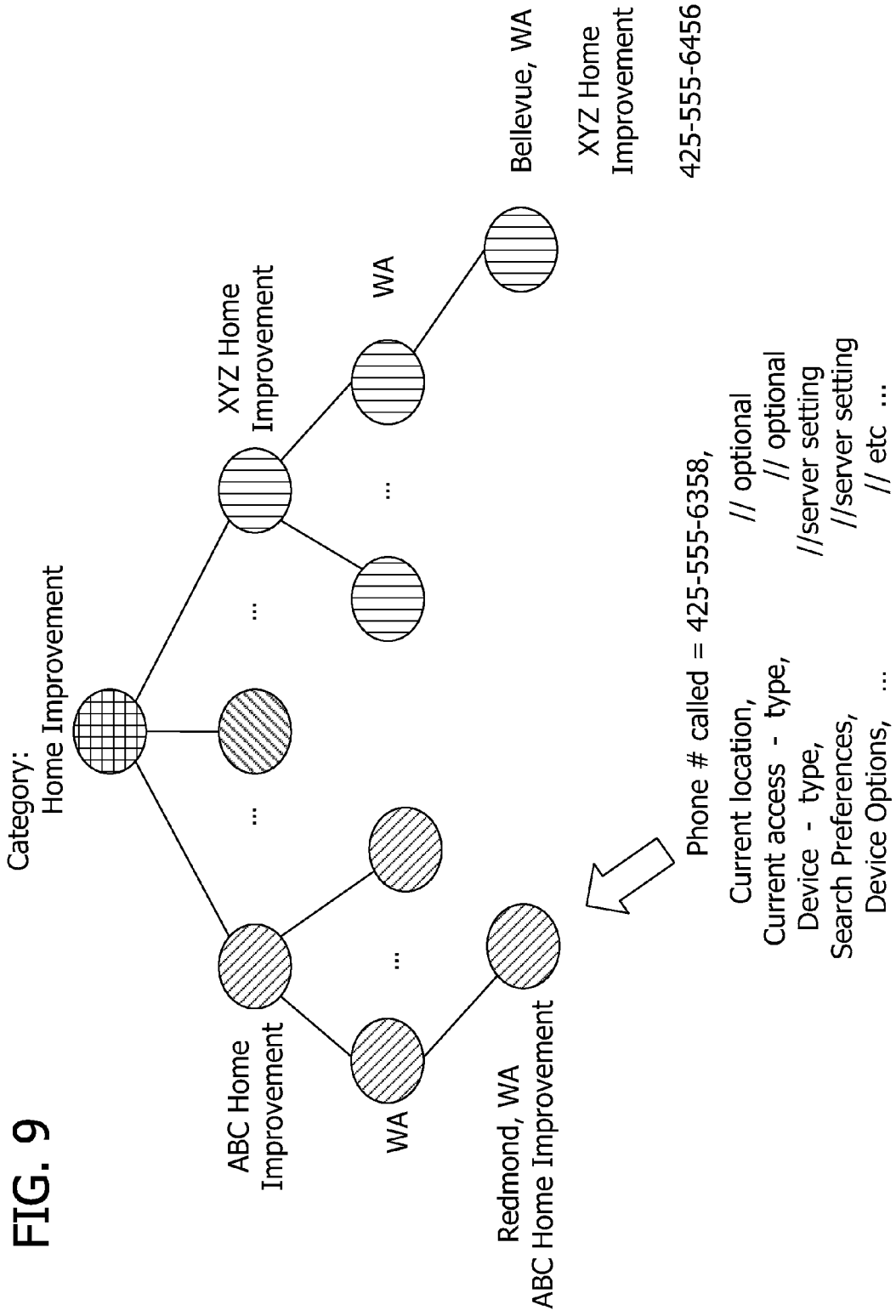
FIG. 9 is an exemplary block diagram illustrating a categorization engine for determining a category of an entity associated with a telephone number.

Referring next to FIG. 9, an exemplary block diagram illustrates a categorization engine for determining a category of an entity associated with a telephone number. In the example of FIG. 9, based on a telephone number, the web service 208 or other logic determines a category for the telephone number using a binary tree. The web service 208 identifies the location of the telephone number (e.g., based on the prefix) and the entity name. For example, a reverse lookup service is used to determine this information. Based on the entity name, the category is identified. Once the category has been identified, the web service 208 is able to identify other entities in the same category.

EXAMPLES

Figure 10:
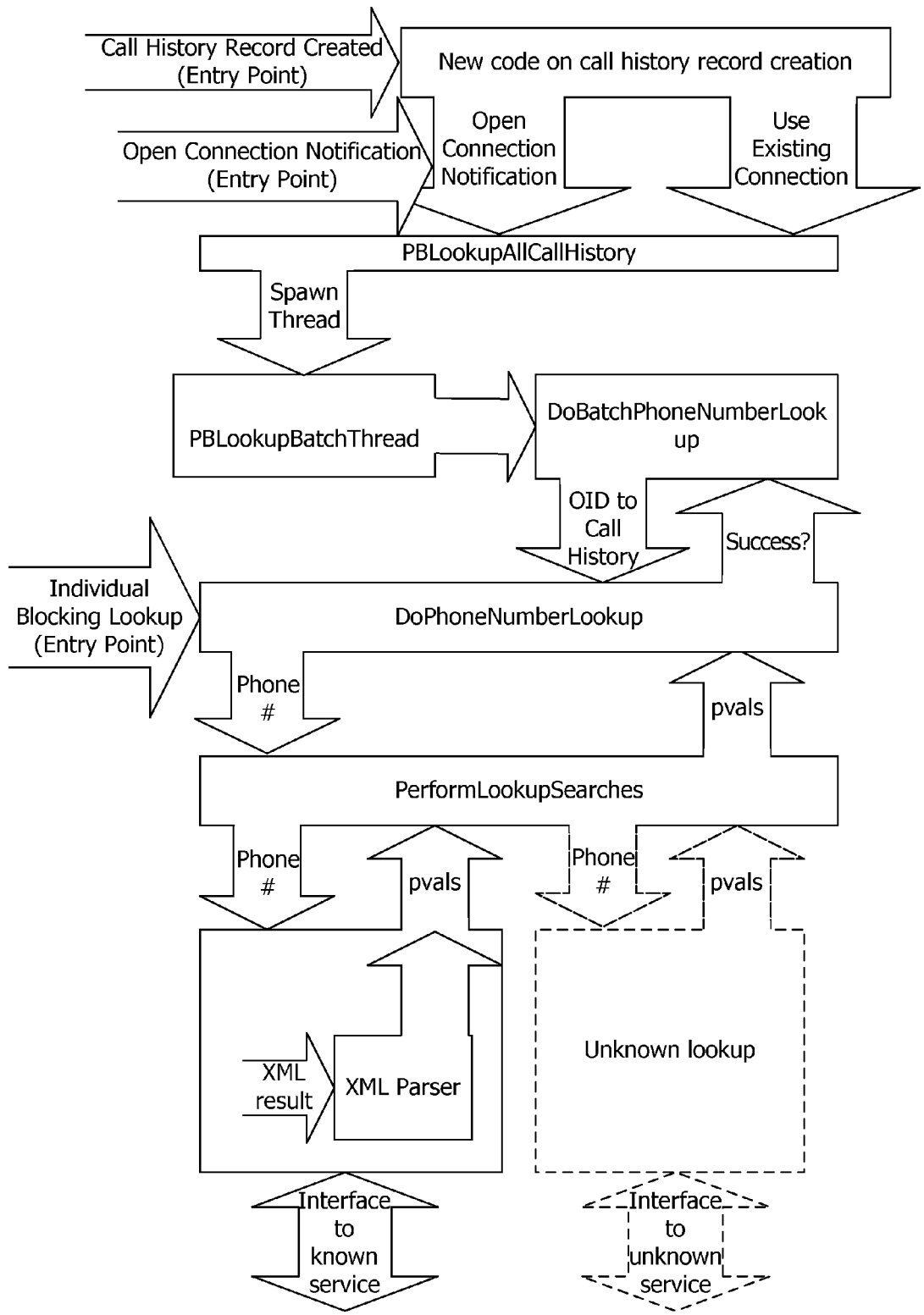
FIG. 10 is an exemplary block diagram illustrating an exemplary implementation of identifying entity information based on a call.

FIG. 10 is an exemplary block diagram illustrating an exemplary implementation of identifying entity information 209 based on a call. Other implementations are within the scope of the disclosure.

In some embodiments, the web service 208 performs a reverse telephone number lookup to obtain the entity information 209. If the entity is determined to be a person, the web service 208 also searches one or more social networking sites to obtain information about the person. For example, the hobbies, interests, birthday, or other publicly available information about the person may be obtained and delivered to the computing device 102 as part of the entity information 209.

In a real estate scenario, the user 202 is driving through a neighborhood looking for available houses. The user 202 finds a house, and wants to learn more about the house including the asking price, square footage, age, etc. The user 202 calls the agent listed on the for sale sign. The web service 208 receives the telephone number of the agent and a location of the user 202 (using GPS on the mobile computing device 204). The web service 208 then uses a reverse telephone number lookup to identify the agent. Based on the agent name, the web service 208 identifies a web page of the agent with the current house listings, and obtains information about the house of interest based on the location of the user 202. This information is then provided to the user 202 during the call to the agent. A contact entry (e.g., such as contact entry 110) for the agent is created on the mobile computing device 204 of the user 202. The house information is stored with the newly created contact entry for future reference by the user 202. Additionally, information about other local listings by that agent or other agents may also be provided to the user 202.

In some embodiments, the entity information 209 is obtained on every called telephone number that does not have a corresponding contact entry 110. In other embodiments, the entity information 209 is obtained only when the user 202 inputs a code while dialing the telephone number. For example, the user 202 may append a one or two digit code to the end of the dialed telephone number to instruct the mobile computing device 204 to resolve the telephone number, obtain the entity information 209, and store the entity information 209 as one of the contact entries 110 on the mobile computing device 204. A separate code may be used to identify the level of detail requested in the entity information 209. For example, a different one or two digit code instructs the web service 208 to obtain a map of the callee and place the map in a scratch pad or other temporary location.

In an example in which the mobile computing device 204 operates on a 3G or 4G network, the SUBSCRIBE and EVENT primitives are used to convey the entity information 209 during the call. On such networks, the mobile computing device 204 allows SUBSCRIBE to an EVENT during call setup. This allows networks to resolve the entity information 209 on demand during the call setup.

In some embodiments, when an incoming call is received and before the user 202 gets a chance to answer it, the service 208 is used to find the data associated with the call originator before the user 202 answers the call. In such embodiments, the user 202 is better able to determine whether to answer the call, and/or better able to make the call productive using the data.

Exemplary Operating Environment

Aspects of the invention transform a general-purpose computer into a special-purpose computing device when configured to execute the instructions described herein.

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for identifying the entity information 209 relevant to the user 202 based on a location of the mobile computing device 204 and the category describing the entity information 209, and exemplary means for profiling the user 202 of the mobile computing device 204 to select a subset of the received entity information 209.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for creating or updating contact information based on telephone calls, said system comprising:
   a memory area for storing a contact entry for a telephone number; and
   a processor associated with a mobile computing device, said processor programmed to:
      detect the telephone number associated with a telephone call;
      responsive to the detection of the telephone number associated with the telephone call, receive entity information from a data source, said entity information including advertisement content relating to an entity associated with the detected telephone number associated with the telephone call;
      provide the received entity information to the mobile computing device; and
      update the contact entry stored in the memory area with the received entity information.

2. The system of claim 1, wherein the telephone call is an outbound telephone call and the telephone number corresponds to a destination telephone number associated with the outbound telephone call from the mobile computing device, wherein the received entity information is related to an entity associated with the destination telephone number.

3. The system of claim 2, wherein the processor is further programmed to:
   obtain additional information corresponding to a competitor of the entity associated with the destination telephone number; and
   provide the obtained additional information to the mobile computing device.

4. The system of claim 2, wherein the entity information is received only upon a user of the mobile computing device inputting a code along with the destination telephone number.

5. The system of claim 1, wherein the received entity information is related to a category associated with the telephone number associated with the telephone call.

6. The system of claim 5, wherein a web service provides one or more local listings by at least one other entity from the entity related to the detected telephone number, the at least one other entity being related to the category associated with the telephone number.

7. The system of claim 1, wherein the received entity information includes at least a map for an entity associated with the telephone number.

8. The system of claim 1, wherein the telephone call is an inbound telephone call and the telephone number corresponds to a call originator associated with the inbound telephone call to the mobile computing device, wherein the entity information is received before a user answers the inbound telephone call.

9. A method comprising:
   detecting, by a processor associated with a computing device, an identifier associated with a call on the computing device;
   responsive to the detection of the identifier associated with the call, receiving entity information from a data source, said entity information being related to a competing entity of an entity related to the detected identifier associated with the call; and
   providing the received entity information related to the competing entity to the computing device.

10. The method of claim 9, wherein the call is an outbound call and the identifier corresponds to a destination identifier associated with an outbound call from the computing device, wherein the received entity information is related to an entity associated with the destination identifier.

11. The method of claim 10, further comprising:
    obtaining additional information corresponding to a competitor of the entity associated with the destination identifier; and
    providing the obtained additional information to the computing device.

12. The method of claim 9, wherein the received entity information is related to a category associated with the identifier associated with the call.

13. The method of claim 12, wherein a web service provides one or more local listings by at least one other entity from the entity related to the identifier associated with the call, the at least one other entity being related to the category associated with the identifier.

14. The method of claim 9, wherein the call is an inbound call and the identifier corresponds to a call originator associated with the inbound call to the computing device, wherein the entity information is received before a user answers the inbound call.

15. The method of claim 9, wherein the received entity information includes at least a map for an entity associated with the identifier associated with the call.

16. A computer storage media comprising computer executable instructions that upon execution by a processor associated with a web service perform operations comprising:
   receiving a location of a user of a mobile computing device and a telephone number associated with a telephone call on the mobile computing device;
   identifying an entity associated with the telephone number associated with the telephone call;
   obtaining information, associated with the identified entity associated with the telephone number associated with the telephone call, based on the location of the user of the mobile computing device;
   identifying a competitor of the entity associated with the telephone number, wherein the obtained information is associated with the competitor of the identified entity associated with the telephone number associated with the telephone call; and
   providing the obtained information to the user during the telephone call.

17. The computer storage media of claim 16, wherein the obtained information is related to an object, associated with the identified entity, near the location of the user of the mobile computing device.

18. The computer storage media of claim 16, wherein the operations further comprise storing the obtained information with a contact entry.

19. The computer storage media of claim 16, wherein the obtained information includes local listings associated with at least one other entity.

20. The computer storage media of claim 16, wherein the obtained information includes advertisement content relating to the competitor of the entity associated with the detected telephone number associated with the telephone call.

\* \* \* \* \*